Figure 1:
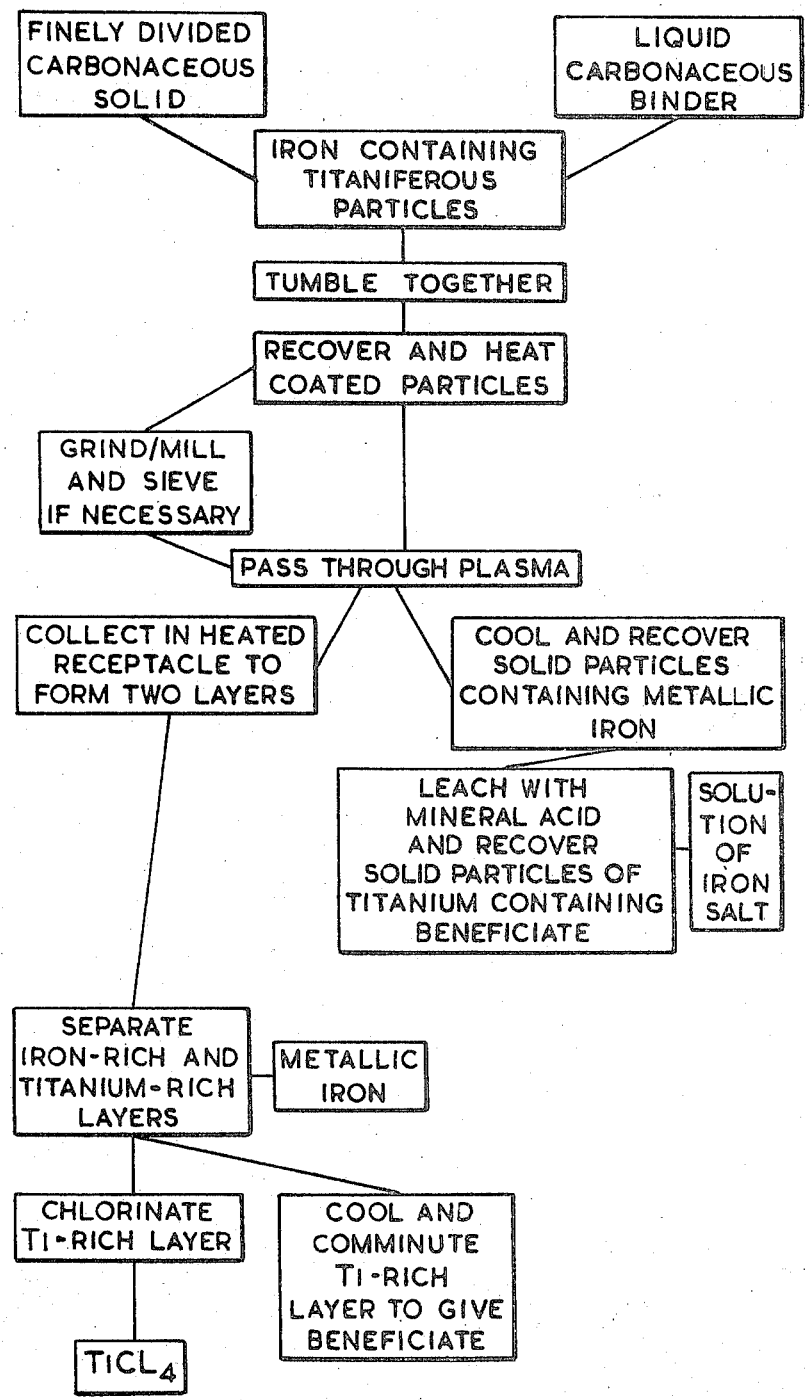

United States Patent [19]
Tylko

[11] 3,853,536
[45] Dec. 10, 1974

[54] PROCESS FOR THE PRODUCTION OF IRON-CONTAINING TITANIFEROUS PARTICLES

[75] Inventor: Jozef Kazimierz Tylko, Faringdon, England

[73] Assignee: British Titan Limited, Billingham, Teesside, England

[22] Filed: Oct. 19, 1973

[21] Appl. No.: 407,810

[30] Foreign Application Priority Data
Nov. 29, 1972  Great Britain.................... 55049/72

[52] U.S. Cl........................... 75/3, 75/10 R, 423/86, 423/492
[51] Int. Cl. ........................... C22b 1/24, C22b 5/10
[58] Field of Search ......... 75/1, 3, 10 R, 11; 423/86

[56] References Cited
UNITED STATES PATENTS

| | | | |
|---|---|---|---|
| 2,476,453 | 7/1949 | Peirce et al. ........................... | 75/1 X |
| 3,004,137 | 10/1961 | Karlovitz.............................. | 75/11 X |
| 3,218,153 | 11/1965 | Schei et al. .............................. | 75/3 |
| 3,257,196 | 6/1966 | Foex .................................... | 75/10 R |
| 3,429,691 | 2/1969 | McLaughlin......................... | 75/10 R |
| 3,739,061 | 6/1973 | Stickney et al. .......................... | 75/1 |
| 3,765,868 | 10/1973 | Moklebust ...................... | 75/10 R X |

FOREIGN PATENTS OR APPLICATIONS

| | | | |
|---|---|---|---|
| 2,038,248 | 2/1971 | Germany .................................. | 75/1 |
| 748,334 | 4/1956 | Great Britain ...................... | 75/10 R |

OTHER PUBLICATIONS

Tyler, P. M., "Plasma for Gtractive Mettalurgy," in J. of Metals, 1/1961, pp. 51–54.

Primary Examiner—A. B. Curtis
Attorney, Agent, or Firm—Schuyler, Birch, Swindler, McKie & Beckett

[57] ABSTRACT

Reduction of iron-containing titaniferous particles by coating the particles with a reductant to provide a free-flowing coated particulate material with an average particle size not in excess of $500\mu$ and thereafter passing the coated particles through a hot gaseous plasma of an inert or reducing gas and thereafter recovering from the reduced product a material containing an increased proportion of titanium.

25 Claims, 2 Drawing Figures

PROCESS FOR THE PRODUCTION OF IRON-CONTAINING TITANIFEROUS PARTICLES

The present invention relates to a process of beneficiation wherein the iron content of an iron-containing titaniferous material is reduced to the metallic state.

Iron-containing titaniferous materials suitable for treatment by the process of the present invention are ilmenites, leucoxenes and mineral rutile. The ilmenites may be beach sand, or a massive, ilmenite and of these the former is normally preferred. Such ilmenites normally contain between 14 percent and 36 percent iron (expressed as Fe) and between 44 percent and 63 percent titanium (expressed as $TiO_2$).

The iron content of the starting material is reduced to the metallic state in a hot gaseous plasma and reduction under such circumstances requires firstly that the reductant must remain in close contact with the iron containing titaniferous material when in particulate form for a sufficient period of time at the required temperature to achieve the desired reduction and, secondly, that enough material can be reduced in the plasma in unit time to provide an acceptable economic yield of the reduced material while, at the same time, avoiding the necessity of a too prolonged dwell time in the plasma. It has also been found necessary to utilise particles which are small enough to render the plasma unstable.

It has proved difficult to obtain the desired degree of reduction where particles of the iron-containing titaniferous material are merely contacted with a hot plasma formed in a reducing gas or where a solid reductant and the particles of an iron-containing titaniferous material are merely mixed together before passing through a plasma and it is an object of the present invention to provide a process whereby the objectives set out above are, at least in part, achieved.

Accordingly, the present invention is a process for the treatment of an iron-containing titaniferous material comprising coating the material in particulate form with a reducing substance in such a manner as to provide a free-flowing coated particulate material having an average particle size not greater than $500\mu$, feeding the coated particles through a hot gaseous plasma forming an inert or reducing atmosphere and thereafter recovering from the product a material containing an increased proportion of titanium.

The average particle size of the iron-containing titaniferous material prior to coating is preferably in the range $100\mu$ to $450\mu$ and particularly in the range $150\mu$ to $350\mu$.

The most usual reductant is a carbonaceous material and is preferably, at least in part, in the solid form, for example finely divided coke, graphite or soot. The form and action of such solid material is normally improved if mixed with a liquid binder such as oil, a residual oil or a solubilised pitch or the like. After mixing the particles with the solid reductant and, if desired, with a proportion of a liquid binder, the free flowing characteristics of the product may be improved by heating the particles, for example during and/or after tumbling together the iron-containing titaniferous particles and reductant, to drive off the more volatile substances in the reductant coating, thereby "drying" the coated particles. Heating to temperatures in the range 300°C to 400°C and preferably to temperatures in the range 340°C to 360°C has been found very suitable.

It is possible to avoid the heating step referred to above where the reductant is a finely divided solid carbonaceous material, for example soot, if insufficient liquid has been added as a binder, for example an oil, to impair the free-flowing properties of the product but which still forms an effective binder.

If agglomeration does occur during the coating process to produce coated particles which are larger than those required by the present invention, the particle size of the product can be reduced, for example by light milling or grinding, followed by sieving to obtain coated particles in the required range of particle sizes.

The average particle size of the particles, after coating, should not be in excess of 500 since larger particles have been found to produce instability in hot gaseous plasmas, particularly those formed by electrical heating such as by an arc between electrodes or by induction heating. It is preferred that the average particle size after coating should be in the range $200\mu$ to $400\mu$ and it is particularly preferred that the material does not contain a substantial number of particles greater than about $450\mu$ and smaller than about $100\mu$. The material may, as noted previously, be sieved before use to ensure this as far as possible, for example by passing the material after light milling and grinding if necessary, through sieves of mesh numbers 36 and 150 B.S.S. (British Standard Sieve).

Sufficient reductant is normally applied to the iron-containing titaniferous particles to provide between about 0.5 and 2 and particularly between 0.8 and 1.5 times the stochiometric quantity required to reduce the iron content of the particles to the metallic state. These quantities include both reductant present as a solid and as a binder, when added. Where the coating contains less than the stochiometric quantity of reductant the remaining reductant can be supplied by gases in the plasma, for example by hydrogen or hydrocarbons such as methane, propane, and/or butane which may be introduced into, or which may form, the hot gaseous plasma. Other gases in the plasma may be inert gases such as nitrogen or argon.

In addition to the reducing substances in the coating on the iron-containing titaniferous particles it is also advantageous to include other materials, for example to improve the fluidity of the titaniferous slag if formed and/or to increase the electrical conductivity of the plasma so that there is formed a "tail flame" zone below the lower electrode (normally the anode) thereby increasing the volume of the plasma and thus providing a greater opportunity for heating and for the reduction of the iron in the material. Such additions may, for example, consist of alkaline earth compounds such as the oxides and/or alkali metal compounds such as the fluorides or chlorides. Generally, amounts of alkaline earth compounds in the range 1 percent to 5 percent (expressed as the oxide) and of alkali metal compounds of up to 8 percent (also expressed as the oxide) have been found advantageous although, of course, greater or lesser amounts can be used if advantages are thereby obtained.

After passage through the plasma the reduced product may either be recovered, retained in the molten state and allowed to separate into two layers, i.e., into an iron-rich layer and a titanium-rich layer, the latter being a beneficiated product of the process. The separate layers may be recovered, separated, cooled and comminuted for further use or, alternatively, they may be physically separated without substantial cooling and the hot titanium-rich layer may be treated, for example by chlorination, to produce a more desirable product such as titanium tetrachloride.

By treatment without substantial cooling at least part of the heat provided during the reduction is utilised and costs are thereby significantly reduced.

In order to recover the product in the molten state it is, of course, necessary to maintain the collecting vessel at a temperature above the melting point of the product for example by the use of heating means such as burners etc. Where one part of the product, for example the titanium-rich layer, is to be retained in its molten state for further treatment such as chlorination it is desirable to separate the two molten layers. If the iron is required in a finely divided solid form this can then be cooled and comminuted while the molten titanium-rich slag is being treated. One simple means for separating the molten layers is to provide a receptacle with a weir over which the molten titanium-rich slag can flow into another receptacle while the molten iron is tapped off from the original receptacle.

Alternatively, the product can be recovered as solid particulate material of similar particle size to that of the starting material but with its iron content reduced to metallic iron. The iron can then be removed from the reduced particles, for example by leaching them with a suitable mineral acid such as sulphuric and hydrochloric acid. In order to recover the material in particulate form it is necessary to cool the material rapidly after it leaves the plasma instead of collecting it in a heated receptacle. The cooling can be effected by any of the commonly used techniques for cooling particulate solids, for example by cooling the material as it leaves the plasma by contact with a cooler gas or even a liquid. The gas or liquid used to cool the hot particles should, of course, normally provide an environment wherein the reoxidation of metallic iron is prevented. It may be advantageous, however, to contact the product, particularly the molten titanium-rich layer formed in a heated receptacle, with an oxidising gas to a limited extent to remove some of the impurities such as iron, silicon and/or aluminium retained therein. Under carefully controlled conditions of oxidation at least some of these impurities may be removed as their oxides in the form of a fume. One method whereby this may be accomplished is to pass heated air and oxygen counter current to the flow of molten titanium-rich slag after its passage over the weir into the second receptacle in which it is separated from the molten iron-rich material. In addition to removing impurities, limited contact with an oxidising gas also reoxidises any titanium present in the slag in a lower valency state to the quadrivalent form.

The method of forming the plasma used in the process does not form part of the present invention and any of the known methods of obtaining hot gaseous plasmas may be used, as desired. However, one form of plasma forming equipment and process for its use which is suitable for use in the present invention is described in U.S. Pat. No. 3,429,665. Alternatively, where the arc is formed between electrodes it is advantageous to increase the volume of the plasma by the use of an upper electrode, normally the cathode, the lower end of which rotates around a fixed point and which therefore gives a plasma in the form of a cone. The opposing electrode, normally the anode, is in the form of a ring and the arc is struck between the free end of the rotating electrode and the opposing ring-like electrode. By this means, as noted above, the volume of the plasma is expanded in the form of a cone. The coated material is introduced into the plasma at about the apex of the cone, i.e., near the fixed point of the rotating electrode and it falls through the expanded plasma and is heated and the iron content is reduced as it falls. The reduced material falls through the ring-like electrode and is collected in the appropriate receptacle below, the nature of which depends upon whether it is to be collected in the molten state or as solid reduced particulate material.

Figure 2:
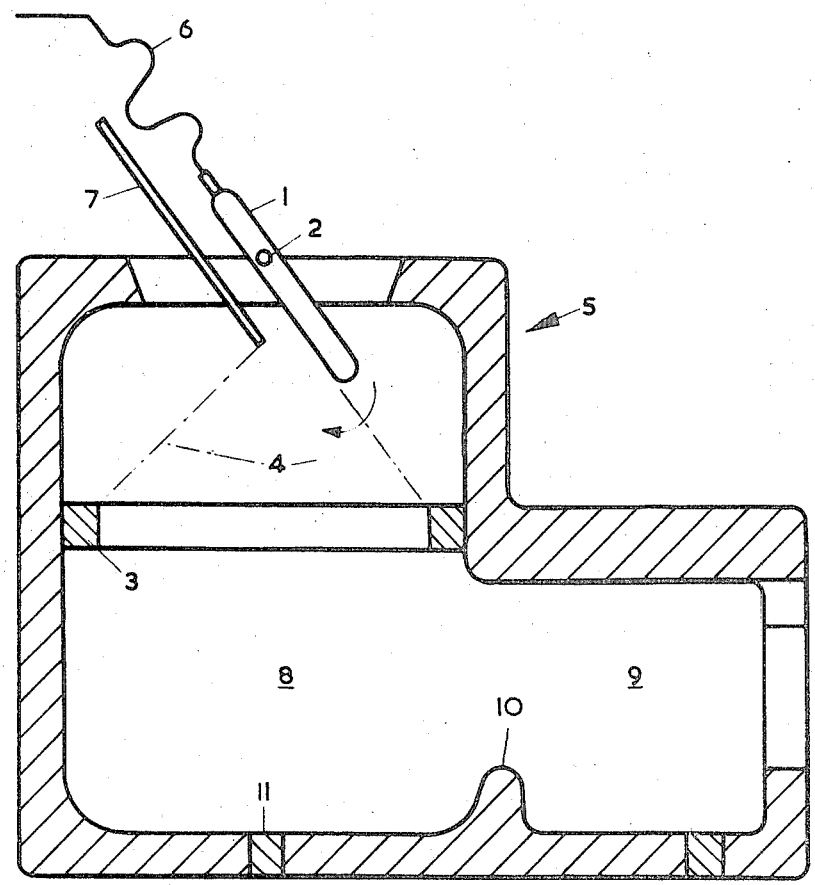

FIG. 1 of the accompanying drawings shows a suitable flow sheet for the process of the present invention and FIG. 2 is a diagrammatic representation of an expanded plasma-producing device and collecting receptacle for the molten product.

In FIG. 2 there is an electrode 1 rotating about point 2 in the direction shown by the arrow and from the lower end of which an arc is struck on the opposing ring-like electrode 3 to form a cone shaped plasma 4 within furnace 5. A plasma forming gas is introduced through the rotating electrode via flexible pipe 6 which also provides the electrical connection to the electrode. Coating particles of iron-containing titaniferous material are introduced through pipe 7 into the plasma. Both receptacles 8 and 9 are preheated to a temperature above that of the melting point of the reduced material by burners (not shown). Molten iron and molten titaniferous slag collect in receptacle 8 and separate into a lower layer of molten iron and an upper molten titanium-rich layer. As the amount increases the upper layer rises over the weir 10 and collects in receptacle 9 in which it can be chlorinated by passing chlorine through the melt or from which it can be recovered, cooled and comminuted as desired. When receptacle 8 is filled with molten iron to the top of the weir the process can be stopped and the molten iron tapped off through port 11 and the process continued or repeated. If desired, controlled amounts of an oxygen-containing gas such as air can be introduced above the weir 10 and receptacle 9 to reoxidise any titanium in the lower valency state and/or to oxidise impurities in the titanium-rich material/to the corresponding oxide(s).

The following Examples show embodiments of the present invention.

EXAMPLE 1

18,000 grams of ilmenite concentrate having a composition as under was mixed with 1,800 grams of particulate coke having a typical composition as under and with 200 grams of sodium chloride.

ILMENITE

| | Chemical analysis | Size analysis | |
|---|---|---|---|
| $TiO_2$ | 53.8–52.2 % | 355μ 99.7 % | less than |
| FeO | 23.0–24.9 % | 180μ 74.8 % | do. |
| | | 150μ 48.7 % | do. |
| | | 125μ 21.1 % | do. |
| | | 90μ 0.6 % | do. |
| | | 63μ 0.03% | do. |

COKE

| British Standard Sieve Mesh No. | Range % Cumulative retained on sieve of given number |
|---|---|

ILMENITE-Continued

| Chemical analysis | Size analysis |
|---|---|
| 12 | N/D |
| 16 | N/D – 0.3 |
| 22 | 17.8 – 21.7 |
| 30 | 43.5 – 52.5 |
| 44 | 66.8 – 78.3 |
| 60 | 81.8 – 93.1 |
| 85 | 92.7 – 99.5 |
| 100 | 98.0 – 99.9 |
| 120 | 99.3 – 99.9 |
| 150 | 99.8 – 99.9 |

To this was added 750 cc. of mineral oil, of low viscosity. The mixture was tumbled for 1 hour and then placed in a closed vessel and baked at 350°C for 6 hours. After cooling the mixture was crushed and sieved to retain particles in the size range of 200 microns to 400 microns (which amounted to 90 percent by weight of the original mixture).

The resulting feedstock was fed without difficulty at the rate of 12 grams/second for thirty minutes to a plasma furnace similar to that shown in FIG. 1 of this specification operating at 70 kW. The furnace, which was preheated to about 1,400°C to avoid thermal shock, operated at 320 amperes and the cathode was rotated at a uniform speed 350 r.p.m. to form a cone-shaped plasma. The primary plasma gases were 20 c.f.h. at s.t.p. of commercial argon and 10 c.f.h. at s.t.p. of a commercial 65 percent argon and 35 percent hydrogen mixture. An additional 20 c.f.h. of propane gas was used to entrain the feedstock into the plasma. An analysis of the flue gas (by Orsat) during the run showed 3% $CO_2$, 39% CO.

At the completion of the feed the products from the furnace were collected and analysed. The iron portion containing 0.2 percent titanium and the slag portion 85 percent titanium (expressed as $TiO_2$), 1.2 percent free iron and 3.1 percent iron oxide. The titania-rich layer which collected above the iron-rich layer in a molten state could be further processed by allowing it to pass into the adjoining receptacle countercurrent to an oxidising atmosphere, e.g., air or oxygen-enriched air which allows a substantial amount of residual iron content, silica and alumina content to be fumed out and oxidises substantially all the titanium sesquioxide present to titanium dioxide.

EXAMPLE 2

An induction heated plasma was formed and maintained in argon in a device similar to that shown in U.S. Pat. No. 3,429,665 using similar operating conditions.

Iron-containing titaniferous particles coated with a carbonaceous reductant and prepared as described in Example 1 of this specification were supplied to the argon plasma at a rate of about 1 gram/minute in a stream of argon and the product, as it left the plasma, was cooled by blowing argon at about room temperature into the tube below the plasma volume. Due to the relatively high rate of supply the particles were not vaporised during their passage through the plasma but underwent some surface fusion and their iron content was reduced to the metallic state. Generally the reduced product was of similar particle size to that of the particles supplied to the plasma.

The particles were susceptible to leaching with hydrochloric or sulphuric acid whereby the iron is removed as the ferrous salt leaving a particulate product containing an increased proportion of titanium and of similar particle size to that of the original material.

What is claimed is:

1. A process for the treatment of an iron-containing titaniferous material comprising coating the material in particulate form with a reducing substance in such a manner as to provide a free-flowing coated particulate material having an average particle size not greater than 500µ feeding the coated particles through a hot gaseous plasma forming an inert or reducing atmosphere and thereafter recovering from the product a material containing an increased proportion of titanium.

2. A process as claimed in claim 1 wherein the particulate iron-containing titaniferous material, before coating has an average particle size in the range 100µ to 450µ.

3. A process as claimed in claim 2 wherein the material, before coating, has an average particle size in the range 150µ to 350µ.

4. A process as claimed in claim 1 wherein the iron-containing titaniferous particles are coated with a solid carbonaceous reductant containing a liquid binder.

5. A process as claimed in claim 4 wherein the solid carbonaceous reductant is selected from the group consisting of finely divided coke, graphite and soot and the liquid binder selected from the group consisting of an oil, and a solubilised pitch.

6. A process as claimed in claim 1 wherein the iron-containing titaniferous particles are heated during or after coating.

7. A process as claimed in claim 6 wherein the particles are heated to a temperature in the range 300°C to 400°C.

8. A process as claimed in claim 7 wherein the particles are heated to a temperature in the range 340°C to 360°C.

9. A process as claimed in claim 1 wherein the coated particles are subjected to milling and sieving before passing through the plasma.

10. A process as claimed in claim 1 wherein the average size of the particles after coating is in the range 200µ to 400µ.

11. A process as claimed in claim 1 wherein the coated particles to be passed through the hot gaseous plasma do not contain a substantial number of particles greater than 450µ and smaller than 100µ.

12. A process as claimed in claim 1 wherein sufficient reductant, including binder, is applied to the iron-containing titaniferous particles to provide between 0.5 and 2 times the stoichiometric quantity required to reduce the iron content of the particles to the metallic state.

13. A process as claimed in claim 12 wherein the quantity is in the range 0.8 to 1.5 times the stoichiometric quantity required to reduce the iron content of the particles to the metallic state.

14. A process as claimed in claim 1 wherein the hot gaseous plasma contains a gas selected from the group hydrogen, methane, propane, butane, nitrogen and argon.

15. A process as claimed in claim 1 wherein the coating on the particles contains a material selected from the group consisting of an alkaline earth and an alkali metal compound.

16. A process as claimed in claim 15 wherein the alkaline earth compound is an alkaline earth oxide and the alkali metal compound is a fluoride or a chloride.

17. A process as claimed in claim 15 wherein the amount of alkaline earth compound is in the range 1 percent to 5 percent, and of the alkali metal compound up to 8 percent, both expressed as the oxide.

18. A process as claimed in claim 1 wherein the material from the plasma is passed into a heated container and is maintained in the molten state.

19. A process as claimed in claim 18 wherein the molten material forms into an iron-rich layer and a titania rich layer.

20. A process as claimed in claim 19 wherein the titanium-rich layer is separated from the iron-rich layer.

21. A process as claimed in claim 20 wherein the titanium-rich layer is subjected to chlorination.

22. A process as claimed in claim 19 wherein the molten titanium-rich layer is separated from the molten iron layer by means of a wier.

23. A process as claimed in claim 1 wherein the reduced material is recovered from the plasma in solid particulate form.

24. A process as claimed in claim 23 wherein the reduced particles are subjected to leaching with a mineral acid.

25. A process as claimed in claim 19 wherein the molten titanium-rich layer is contacted with an oxidising gas to remove impurities and to oxidise lower valency compounds of titanium to the tetravalent state.

* * * * *